: US010677813B2

(12) United States Patent  
Sato

(10) Patent No.: US 10,677,813 B2  
(45) Date of Patent: Jun. 9, 2020

(54) PHYSICAL QUANTITY DETECTOR, PHYSICAL QUANTITY DETECTION DEVICE, ELECTRONIC APPARATUS, AND VEHICLE

(71) Applicant: Seiko Epson Corporation, Tokyo (JP)

(72) Inventor: Kenta Sato, Shiojiri (JP)

(73) Assignee: Seiko Epson Corporation (JP)

(*) Notice: Subject to any disclaimer, the term of this patent is extended or adjusted under 35 U.S.C. 154(b) by 159 days.

(21) Appl. No.: 15/909,202

(22) Filed: Mar. 1, 2018

(65) Prior Publication Data  
US 2018/0267078 A1 Sep. 20, 2018

(30) Foreign Application Priority Data  
Mar. 16, 2017 (JP) ................. 2017-050920

(51) Int. Cl.  
*G01P 15/097* (2006.01)  
*G01P 1/02* (2006.01)  
*G01P 15/08* (2006.01)

(52) U.S. Cl.  
CPC ............ *G01P 15/097* (2013.01); *G01P 1/023* (2013.01); *G01P 2015/0828* (2013.01)

(58) Field of Classification Search  
CPC . G01P 15/097; G01P 1/023; G01P 2015/0828  
USPC ....................................... 73/504.12  
See application file for complete search history.

(56) References Cited

U.S. PATENT DOCUMENTS

2013/0263661 A1* 10/2013 Watanabe ............... G01P 1/023  
73/504.12  
2017/0184626 A1* 6/2017 Kameta ............... G01P 15/0907

FOREIGN PATENT DOCUMENTS

JP        2014-021094 A     2/2014

* cited by examiner

*Primary Examiner* — John Fitzgerald  
*Assistant Examiner* — Rodney T Frank  
(74) *Attorney, Agent, or Firm* — Harness, Dickey & Pierce, P.L.C.

(57) ABSTRACT

A physical quantity detector according to the invention includes a substrate section including a base section, a movable part connected to the base section, a support section extending from the base section, an extending part extending from the support section, and a physical quantity detection element fixed to the base section and the movable part, and a weight fixed to the movable part, and the extending part and the weight overlap each other in a planar view from the thickness direction of the extending part.

20 Claims, 13 Drawing Sheets

PHYSICAL QUANTITY DETECTOR, PHYSICAL QUANTITY DETECTION DEVICE, ELECTRONIC APPARATUS, AND VEHICLE

BACKGROUND

1. Technical Field

The present invention relates to a physical quantity detector, a physical quantity detection device, an electronic apparatus, and a vehicle each equipped with the physical quantity detector.

2. Related Art

In the past, there has been known a physical quantity detection device (e.g., an acceleration sensor) using a physical quantity detection element such as a vibrator element. Such a physical quantity detection device has a configuration in which force acts in a detection axis direction to thereby make the resonance frequency of the physical quantity detection device vary, and thus the physical quantity (the acceleration) applied to the physical quantity detection device is detected. Further, in order to increase the output sensitivity, the physical quantity detection element is fixed to a cantilever, and a weight is attached to one end of the cantilever.

However, a physical quantity detection device described in JP-A-2014-21094 has a structure in which a weight is made to have contact with a frame part (a support section) disposed on the periphery of a cantilever to thereby prevent breakage of the cantilever. In the case in which a physical quantity exceeding an allowable value is applied, or in the case in which the weight is made heavier in order to further increase the output sensitivity, there is a problem that the displacement of the weight becomes large, and when the weight has contact with the frame part disposed on the periphery of the cantilever, the frame part disposed on the periphery of the cantilever is broken.

SUMMARY

An advantage of some aspects of the invention is to solve at least a part of the problems described above, and the invention can be implemented as the following application examples or aspects.

Application Example 1

A physical quantity detector according to this application example includes a substrate section including a base section, a movable part connected to the base section, a support section extending from the base section, an extending part extending from the support section, and a physical quantity detection element fixed to the base section and the movable part, and a weight fixed to the movable part, and the extending part and the weight overlap each other in a planar view from a thickness direction of the extending part.

According to this application example, since the extending part extending from the support section overlaps the weight in the planar view, in the case in which the physical quantity exceeding an allowable value is applied, the weight is significantly displaced to have contact with the extending part. However, since the extending part has a cantilever structure, even if the weight has contact therewith, the extending part is deflected in the displacement direction of the weight to thereby make it possible to suppress the amount of the displacement of the weight and the impact by the weight. Therefore, it is possible to prevent the breakage of the support section disposed in the periphery of the cantilever. Therefore, it is possible to provide the physical quantity detector having high sensitivity.

Application Example 2

In the physical quantity detector according to the application example described above, it is preferable that the thickness of the extending part is thicker than a thickness of the support section.

According to this application example, since the thickness of the extending part is thicker than the thickness of the support section, the strength of the extending part increases, it is possible to suppress the amount of the displacement of the weight and the impact by the weight even if the weight has contact therewith, and thus, it is possible to prevent the breakage of the support section disposed in the periphery of the cantilever.

Application Example 3

In the physical quantity detector according to the application example described above, it is preferable that the extending part is provided with a recessed part.

According to this application example, since the extending part is provided with the recessed part, when the weight has contact with the extending part, the tip side of the extending part is easy to be deflected around the recessed part. Therefore, it is possible to suppress the amount of the displacement of the weight and the impact by the weight, and thus it is possible to prevent the breakage of the support section disposed in the periphery of the cantilever.

Application Example 4

In the physical quantity detector according to the application example described above, it is preferable that a thickness of a part of the weight overlapping the support section is thinner than a thickness of a part of the weight overlapping the movable part in the planar view.

According to this application example, since the thickness of the part of the weight overlapping the support section is thinner than the thickness of the part of the weight overlapping the movable part, the weight in an area overlapping the support section becomes easy to be deflected. Therefore, when the weight has contact with the support section, the weight is deflected to thereby suppress the amount of the displacement of the weight and the impact by the weight, and thus, it is possible to prevent the breakage of the support section disposed in the periphery of the cantilever.

Application Example 5

In the physical quantity detector according to the application example described above, it is preferable that the weight is provided with a recessed part in a part between an area where the weight is fixed to the movable part, and an area where the weight overlaps the extending part in the planar view.

According to this application example, since the weight is provided with a recessed part in a part between the area where the weight is fixed to the movable part, and an area where the weight overlaps the extending part, when the weight has contact with the extending part, the weight is easy to be deflected around the recessed part. Therefore, it is possible to suppress the amount of the displacement of the weight and the impact by the weight, and thus it is possible to prevent the breakage of the support section disposed in the periphery of the cantilever.

Application Example 6

In the physical quantity detector according to the application example described above, it is preferable that a joining surface of the weight is a rough surface.

According to this application example, since the joining surface of the weight is a rough surface, when fixing the weight to the movable part, the joining area in the joining surface increases, and thus, the joining strength can be increased. Therefore, the weight becomes hard to come away and it is possible to provide the physical quantity detector having high sensitivity.

Application Example 7

A physical quantity detection device according to this application example includes the physical quantity detector according to any one of the application examples described above.

According to this application example, it is possible to prevent the breakage of the support section disposed in the periphery of the cantilever, and it is possible to provide the physical quantity detection device equipped with the physical quantity detector having high sensitivity.

Application Example 8

An electronic apparatus according to this application example includes the physical quantity detector according to any one of the application examples described above.

According to this application example, it is possible to prevent the breakage of the support section disposed in the periphery of the cantilever, and it is possible to provide the electronic apparatus equipped with the physical quantity detector having high sensitivity.

Application Example 9

A vehicle according to this application example includes the physical quantity detector according to any one of the application examples described above.

According to this application example, it is possible to prevent the breakage of the support section disposed in the periphery of the cantilever, and it is possible to provide the vehicle equipped with the physical quantity detector having high sensitivity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Some preferred configuration examples of a physical quantity detector according to the invention, and a physical quantity detection device, an electronic apparatus, and a vehicle each equipped with the physical quantity detector will hereinafter be described based on the accompanying drawings.

Physical Quantity Detector

First Embodiment

Firstly, a physical quantity detector 1 according to a first embodiment of the invention will be described with reference to FIG. 1 through FIG. 3.

Figure 1:
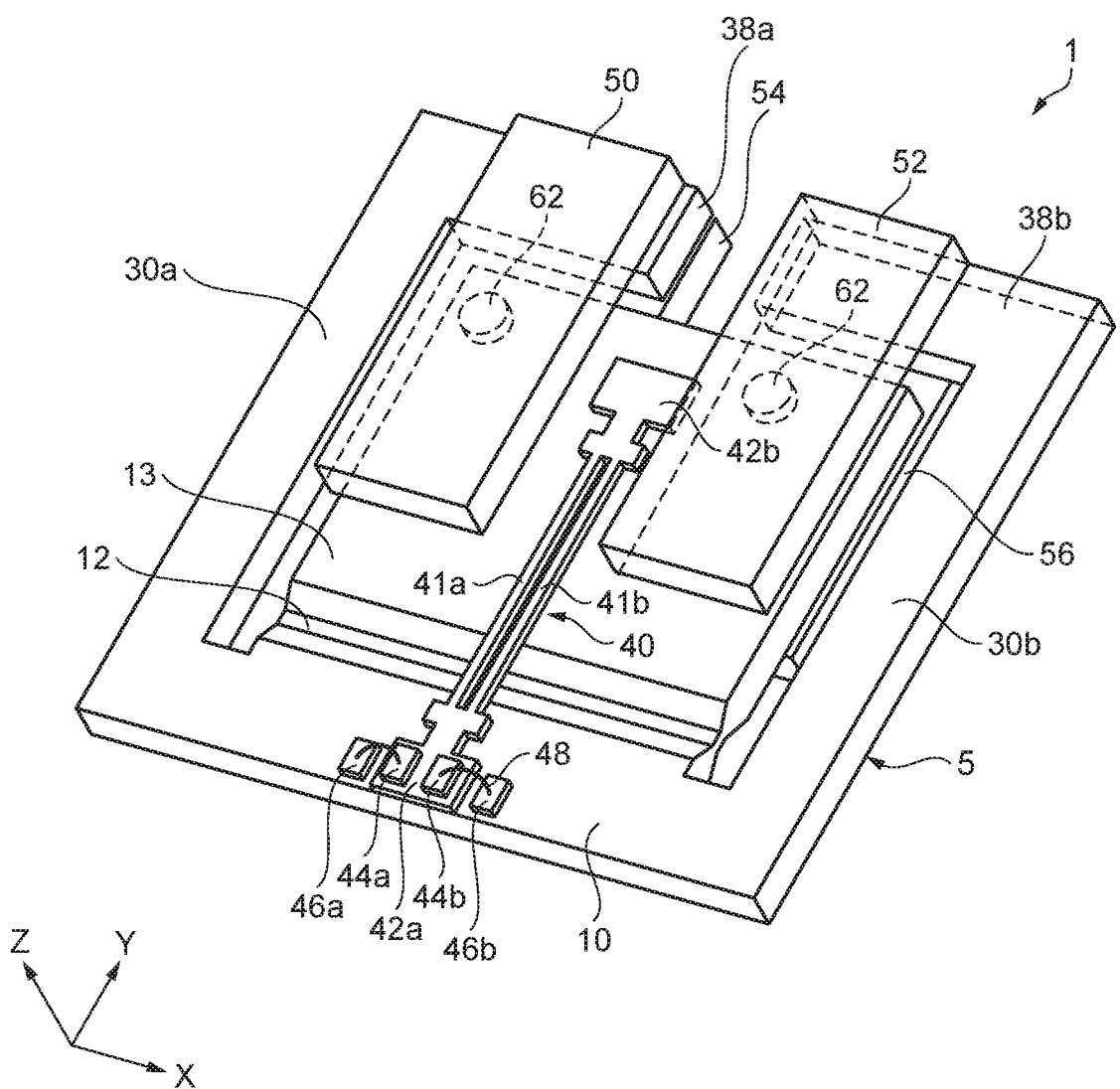
FIG. 1 is a perspective view showing a configuration of a physical quantity detector according to a first embodiment of the invention.
Figure 2:
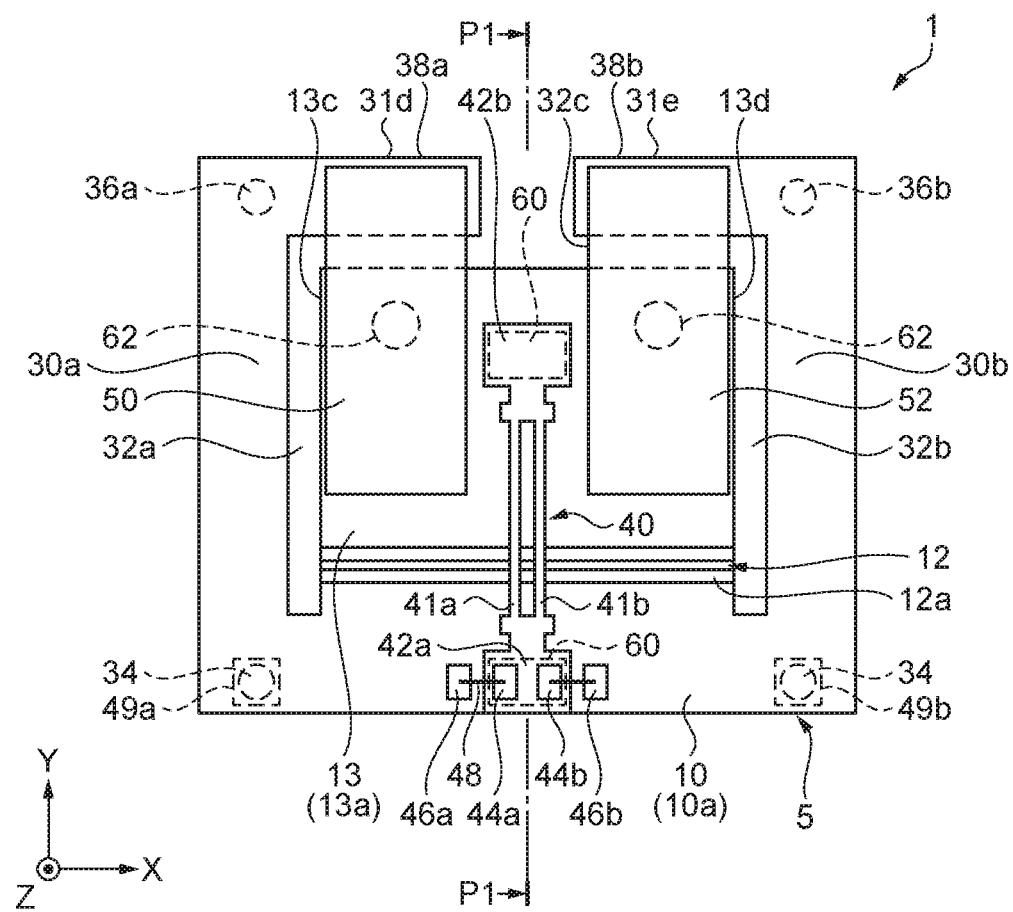
FIG. 2 is a plan view showing the configuration of the physical quantity detector according to the first embodiment.
Figure 3:
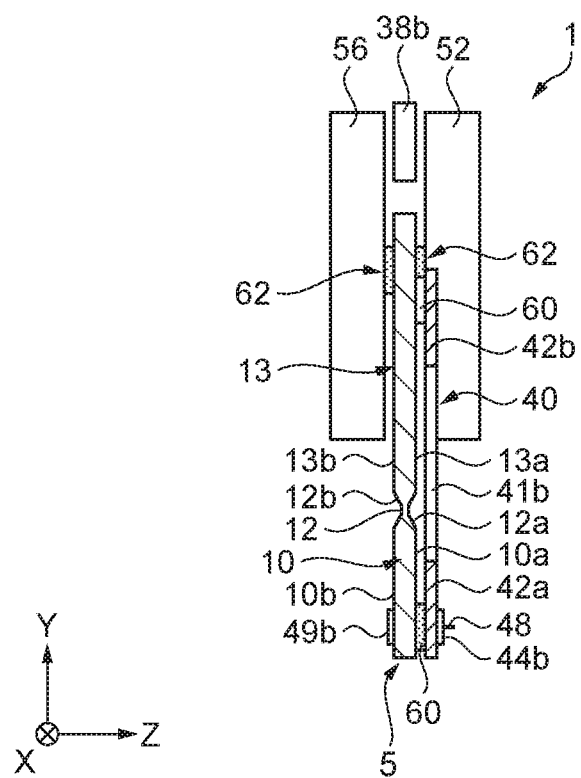
FIG. 3 is a cross-sectional view along the line P1-P1 shown in FIG. 2.

FIG. 1 is a perspective view showing a configuration of the physical quantity detector 1 according to the first embodiment of the invention, FIG. 2 is a plan view showing the configuration of the physical quantity detector 1 according to the first embodiment, and FIG. 3 is a cross-sectional view along the line P1-P1 shown in FIG. 2. It should be noted that in each of the following drawings, an X axis, a Y axis, and a Z axis are shown as three axes perpendicular to each other for the sake of convenience of explanation. Further, the planar view viewed from the Z-axis direction, which is the thickness direction of extending parts 38a, 38b, is also referred to simply as a "planar view" in the following description for the sake of convenience of explanation.

As shown in FIG. 1 through FIG. 3, the physical quantity detector 1 is configured including a substrate section 5 and four weights 50, 52, 54, and 56.

The substrate section 5 is provided with a base section 10, a joint part 12, a movable part 13, two support sections 30a, 30b, and a physical quantity detection element 40, wherein the base section 10 has principal surfaces 10a, 10b extending toward the X-axis direction and facing to respective directions opposite to each other, the joint part 12 extends from the base section 10 toward the Y-axis direction, the movable part 13 extends from the joint part 12 toward the opposite direction to the base section 10 so as to form a rectangular shape, the two support sections 30a, 30b extend from the both ends in the X-axis direction of the base section 10 along the outer edges of the movable part, respectively, and the physical quantity detection element 40 is bridged from the base section 10 to the movable part 13 and is fixed to the base section 10 and the movable part 13.

In the two support sections 30a, 30b, the support section 30a extends along the Y axis forming a gap 32a with the movable part 13, and is provided with a fixation section 36a for fixing the support section 30a, and an extending part 38a extending along the X axis forming a gap 32c with the movable part 13. In other words, the support section 30a extends along the Y axis forming the gap 32a with the movable part 13, and is provided with the extending part 38a extending along the X axis forming the gap 32c with the movable part 13, and is provided with the fixation section 36a disposed between the support section 30a and the extending part 38a. Further, the support section 30b extends along the Y axis forming a gap 32b with the movable part 13, and is provided with a fixation section 36b for fixing the support section 30b, and an extending part 38b extending along the X axis forming the gap 32c with the movable part 13. In other words, the support section 30b extends along the Y axis forming the gap 32b with the movable part 13, and is provided with the extending part 38b extending along the X axis forming the gap 32c with the movable part 13, and is provided with the fixation section 36b disposed between the support section 30b and the extending part 38b.

It should be noted that the fixation sections 36a, 36b provided respectively to the support sections 30a, 30b are for mounting the substrate section 5 of the physical quantity detector 1 on an external member such as a package. Further, the base section 10, the joint part 12, the movable part 13, the support sections 30a, 30b, and the extending parts 38a, 38b are formed integrally with each other.

The movable part 13 is surrounded by the support sections 30a, 30b and the base section 10, and is connected to the base section 10 via the joint part 12 in a cantilevered state. Further, the movable part 13 has principal surfaces 13a, 13b facing to the directions opposite to each other, and a side surface 13c and a side surface 13d as side surfaces forming the principal surfaces 13a, 13b in the planar view, wherein the side surface 13c extends along the support section 30a, and the side surface 13d extends along the support section 30b. The principal surface 13a is a surface facing to the same side as the principal surface 10a of the base section 10, and the principal surface 13b is a surface facing to the same side as the principal surface 10b of the base section 10.

The joint part 12 is disposed between the base section 10 and the movable part 13 to connect the base section 10 and the movable part 13 to each other. The joint part 12 is formed to have the thickness thinner than the thickness of the base section 10 and the thickness of the movable part 13. In this case, the base section 10, the support sections 30a, 30b and the movable part 13 are each formed of a quartz crystal plate, and the joint part 12 has groove parts 12a, 12b formed by performing a half-etching process from the both sides of the crystal plate. These groove parts 12a, 12b are formed along the X axis, and when the movable part 13 is displaced (rotates) with respect to the base section 10, the groove parts 12a, 12b of the joint part 12 each function as a pivot, namely an intermediate hinge. Such joint part 12 and movable part 13 function as a cantilever, and it can be said that the cantilever is provided with the physical quantity detection element 40, and is supported by the base section 10.

Further, to the surface continuing from the principal surface 10a of the base section 10 to the principal surface 13a of the movable part 13, there is fixed the physical quantity detection element 40 with a joining material 60. The fixation positions of the physical quantity detection element 40 are two places, namely central positions in the X-axis direction of the principal surface 10a and the principal surface 13a, respectively.

The physical quantity detection element 40 has a base part 42a fixed to the principal surface 10a of the base section 10 with the joining material 60, a base part 42b fixed to the principal surface 13a of the movable part 13 with the joining material 60, and vibrating beam parts 41a, 41b located between the base part 42a and the base part 42b and adapted to detect a physical quantity. In this case, the shape of each of the vibrating beam parts 41a, 41b is a prismatic shape, and when a drive signal (an alternating-current voltage) is applied to excitation electrodes (not shown) respectively disposed to the vibrating beam parts 41a, 41b, the vibrating beam parts 41a, 41b make a flexural vibration along the X axis so as to get away from each other and come closer to each other. In other words, the physical quantity detection element 40 is a tuning-fork vibrator element. It should be noted that as the joining material 60, there can be used, for example, low melting-point glass, or an Au/Sn alloy coating capable of achieving eutectic bonding, and the low melting-point glass is used here.

On the base part 42a of the physical quantity detection element 40, there are disposed extraction electrodes 44a, 44b. These extraction electrodes 44a, 44b are electrically connected to the excitation electrodes (not shown) provided to the vibrating beam parts 41a, 41b. The extraction electrodes 44a, 44b are electrically connected to connection terminals 46a, 46b provided to the principal surface 10a of the base section 10 with metal wires 48. The connection terminals 46a, 46b are electrically connected respectively to the external connection terminals 49a, 49b with interconnections not shown. The external connection terminals 49a, 49b are disposed on the surface (on the side of the principal surface 10b of the base section 10) with which the physical quantity detector 1 is mounted on the package or the like so as to overlap package fixation sections 34 in the planar view. The package fixation sections 34 are for mounting the substrate section 5 of the physical quantity detector 1 on the external member such as the package, and are disposed at two places, namely the end parts on the both end sides in the X-axis direction of the base section 10.

The physical quantity detection element 40 is formed by patterning a crystal substrate, which has been carved out from a raw stone of the crystal at a predetermined angle, using a photolithography process and an etching process. In this case, it is desirable for the physical quantity detection element 40 to be provided with the same material as the material of the base section 10 and the movable part 13 taking the reduction of the difference in linear expansion coefficient between the base section 10 and the movable part 13 into consideration.

The weights 50, 52, 54, and 56 each have a rectangular planar shape, and are provided to the movable part 13. The weights 50, 52 are fixed to the principal surface 13a of the movable part 13 with a joining member 62, and the weights 54, 56 are fixed to the principal surface 13b of the movable part 13 with a joining member 62. Here, one side of the weight 50 fixed to the principal surface 13a, namely a marginal side of the rectangular shape, is aligned in direction with the side surface 13c of the movable part 13 in the planar view, and at the same time, another side thereof is aligned in direction with a side surface 31d of the extending part 38a. Due to such alignment in direction, the weight 50 is disposed on the part of the side surface 13c of the movable part 13, and the weight 50 and the extending part 38a are disposed so as to overlap each other in the planar view. Similarly, one side of the weight 52 fixed to the principal surface 13a, namely a marginal side of the rectangular shape, is aligned in direction with the side surface 13d of the movable part 13 in the planar view, and at the same time, another side thereof is aligned in direction with a side surface 31e of the extending part 38b. Thus, the weight 52 is disposed on the part of the side surface 13d of the movable part 13, and the weight 52 and the extending part 38b are disposed so as to overlap each other in the planar view. One side of the weight 54 having a rectangular shape fixed to the principal surface 13b is aligned in direction with the side surface 13c of the movable part 13 in the planar view, and at the same time, another side thereof is aligned in direction with the side surface 31d of the extending part 38a. Thus, the weight 54 is disposed on the part of the side surface 13c of the movable part 13, and the weight 54 and the extending part 38a are disposed so as to overlap each other in the planar view. Similarly, one side of the weight 56 having a rectangular shape fixed to the principal surface 13b is aligned in direction with the side surface 13d of the movable part 13 in the planar view, and at the same time, another side thereof is aligned in direction with the side surface 31e of the extending part 38b. Thus, the weight 56 is disposed on the part of the side surface 13d of the movable part 13, and the weight 56 and the extending part 38b are disposed so as to overlap each other in the planar view.

In the weights 50, 52, 54, and 56 disposed in such a manner, the weights 50, 52 are arranged symmetrically about the physical quantity detection element 40, and the weights 54, 56 are arranged so as to respectively overlap the weights 50, 52 in the planar view. These weights 50, 52, 54, and 56 are fixed to the movable part 13 with the joining members 62 disposed at respective barycentric positions of the weights 50, 52, 54, and 56. Further, since the weights 50, 54 and the extending part 38a, and the weights 52, 56 and the extending part 38b overlap each other, respectively, in the planar view, in the case in which an excessive physical quantity amount is applied, the weights 50, 52, 54, and 56 have contact with the extending parts 38a, 38b, respectively, and thus, it is possible to suppress the displacements of the weights 50, 52, 54, and 56.

The joining members 62 are each formed of a silicone resin-based thermosetting adhesive or the like. The joining members 62 are applied in two places of each of the principal surface 13a and the principal surface 13b of the movable part 13, and then heated to be cured after the weights 50, 52, 54, and 56 are mounted thereon, to thereby fix the weights 50, 52, 54, and 56 to the movable part 13. It should be noted that the joining surfaces opposed to the principal surface 13a and the principal surface 13b of the movable part 13 of the weights 50, 52, 54, and 56 are each a rough surface. Thus, when fixing the weights 50, 542, 54, and 56 to the movable part 13, the joining area in each of the joining surfaces increases, and thus, the joining strength can be increased.

Then, an operation of the physical quantity detector 1 will be described with reference to FIG. 4 and FIG. 5.

Figure 4:
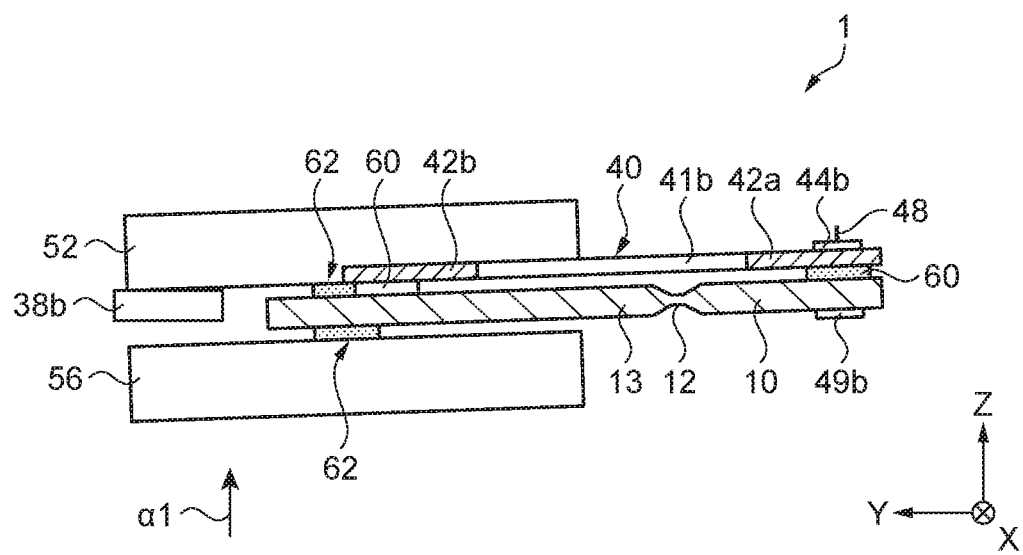
FIG. 4 is a cross-sectional view showing an operation of the physical quantity detector.
Figure 5:
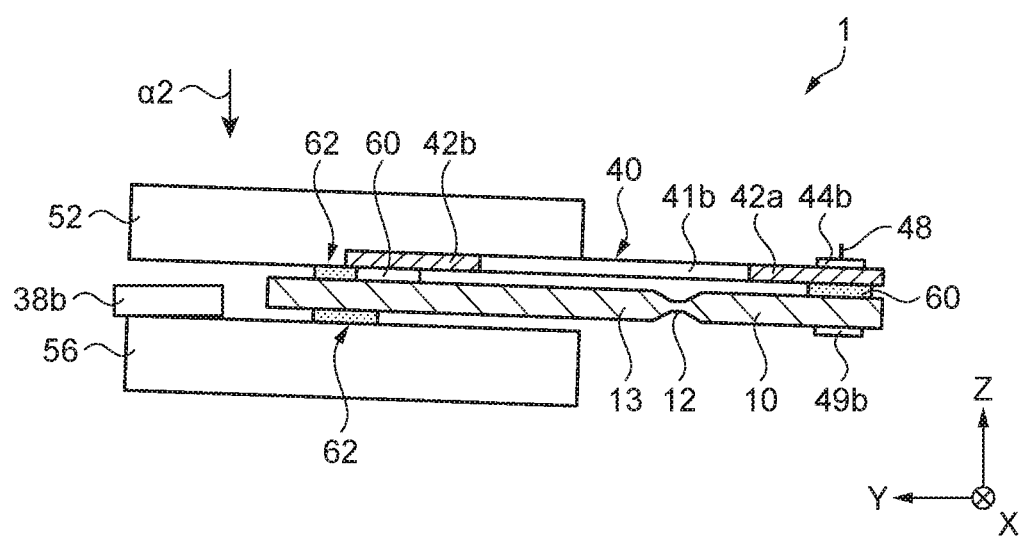
FIG. 5 is a cross-sectional view showing the operation of the physical quantity detector.

FIG. 4 and FIG. 5 are each a cross-sectional view showing the operation of the physical quantity detector 1.

As shown in FIG. 4, when acceleration in the arrow α1 direction (+Z direction) is applied to the physical quantity detector 1, force acts on the movable part 13 in the −Z direction, and the movable part 13 is displaced in the −Z direction taking the joint part 12 as a pivot point. Thus, force in the direction in which the base part 42a and the base part 42b get away from each other along the Y axis is applied to the physical quantity detection element 40, and tensile stress is generated in the vibrating beam parts 41a, 41b. Therefore, the resonance frequency as a frequency at which the vibrating beam parts 41a, 41b vibrates is raised.

In contrast, as shown in FIG. 5, when acceleration in the arrow α2 direction (−Z direction) is applied to the physical quantity detector 1, force acts on the movable part 13 in the +Z direction, and the movable part 13 is displaced in the +Z direction taking the joint part 12 as a pivot point. Thus, force in the direction in which the base part 42a and the base part 42b come close to each other along the Y axis is applied to the physical quantity detection element 40, and compressive stress is generated in the vibrating beam parts 41a, 41b. Therefore, the resonance frequency of the vibrating beam parts 41a, 41b is lowered.

In the physical quantity detector 1, such a variation in the resonance frequency of the physical quantity detection element 40 is detected. Specifically, the acceleration applied to the physical quantity detector 1 is converted into the numerical value determined by a look-up table or the like in accordance with a change rate of the resonance frequency detected as described, to thereby be derived.

It should be noted that the physical quantity detector 1 can also be used as a tiltmeter. In the physical quantity detector 1 as the tiltmeter, the direction in which the gravitational acceleration is applied to the physical quantity detector 1 varies in accordance with the variation of the posture due to the tilt, and the tensile stress or the compressive stress occurs in the vibrating beam parts 41a, 41b. Then, the resonance frequency of the vibrating beam parts 41a, 41b varies as a result, and the variation in the posture due to the tilt is derived.

As described hereinabove, according to the physical quantity detector 1 related to the first embodiment, the following advantages can be obtained.

Since the extending parts 38a, 38b overlap the weights 50, 52, 54, and 56 in the planar view, in the case in which an excessive physical quantity is applied, the weights 50, 52, 54, and 56 are significantly displaced to have contact with the extending parts 38a, 38b. However, since the extending parts 38a, 38b each have the cantilever structure, even if the weights 50, 52, 54, and 56 have contact with the extending parts 38a, 38b, it is possible for the extending parts 38a, 38b to be deflected in the displacement direction of the weights 50, 52, 54, and 56 to thereby suppress the amount of the displacements of the weights 50, 52, 54, and 56 and the impact by the weights 50, 52, 54, and 56. Therefore, it is possible to prevent the breakage of the extending parts 38a, 38b (the support sections 30a, 30b) disposed in the periphery of the cantilever. Therefore, it is possible to provide the physical quantity detector 1 having high sensitivity.

Further, since the joining surfaces of the weights 50, 52, 54, and 56 are each a rough surface, when fixing the weights 50, 52, 54, and 56 to the movable part 13, the joining area in each of the joining surfaces increases, and thus, the joining strength can be increased. Therefore, it is possible to provide the physical quantity detector 1 in which the weights 50, 52, 54, and 56 are hard to come away from the movable part 13, and which has high sensitivity.

It should be noted that in the present embodiment, the material of the base section 10, the joint part 12, the movable part 13, the support sections 30a, 30b and the physical quantity detection element 40 is not limited to the quartz crystal, but can also be a piezoelectric material such as lithium tantalate ($LiTaO_3$), lithium tetraborate ($Li_2B_4O_7$), lithium niobate ($LiNbO_3$), lead zirconium titanate (PZT), zinc oxide (ZnO), or aluminum nitride (AlN). Further, the base section 10, the joint part 12, the movable part 13 and the support sections 30a, 30b can also be made of a non-piezoelectric material such as silicon or germanium, and so on.

Further, although in the present embodiment, there is described the example of using the tuning-fork vibrator element as the physical quantity detection element 40, the configuration of the physical quantity detection element 40 is not particularly limited to the tuning-fork vibrator element providing the frequency varies in accordance with the displacement of the movable part 13. Further, although the physical quantity detection element 40 is disposed only on the principal surface 13a side of the movable part 13, it is also possible to adopt a configuration in which the physical quantity detection element 40 is disposed only on the principal surface 13b side of the movable part 13, and a configuration in which the physical quantity detection element 40 is disposed on the both surface sides, namely on the principal surface 13a side and the principal surface 13b side.

Second Embodiment

Then, a physical quantity detector 1a according to a second embodiment of the invention will be described with reference to FIG. 6 and FIG. 7.

Figure 6:
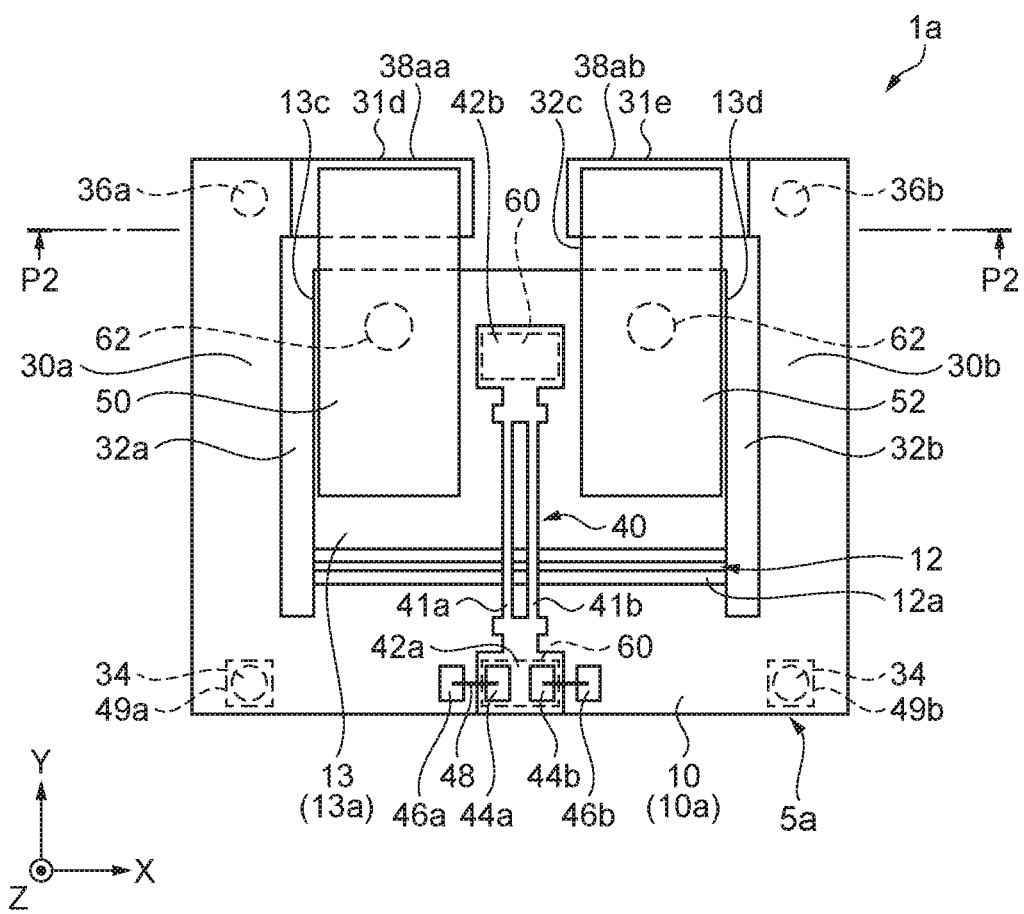
FIG. 6 is a plan view showing a configuration of a physical quantity detector according to a second embodiment of the invention.
Figure 7:
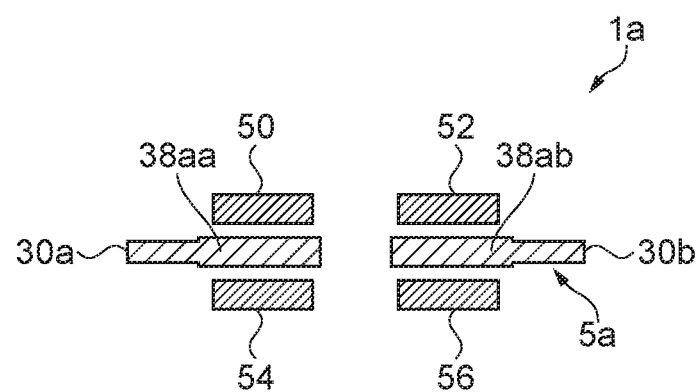
FIG. 7 is a cross-sectional view along the line P2-P2 shown in FIG. 6.

FIG. 6 is a plan view showing a configuration of the physical quantity detector 1a according to the second embodiment, and FIG. 7 is a cross-sectional view along the line P2-P2 shown in FIG. 6. It should be noted that the description will be presented with a focus on the differences from the first embodiment described above, substantially the same constituents are denoted by the same reference symbols, and the description of substantially the same issues will be omitted.

The physical quantity detector 1a according to the second embodiment is different only in the configuration of extending parts 38aa, 38ab provided to a substrate section 5a from the physical quantity detector 1 according to the first embodiment.

As shown in FIG. 6 and FIG. 7, the physical quantity detector 1a is configured so that the thickness of the extending parts 38aa, 38ab becomes thicker than the thickness of the support sections 30a, 30b in the planar view.

According to the physical quantity detector 1a related to the second embodiment, since the thickness of the extending parts 38aa, 38ab is thicker than the thickness of the support sections 30a, 30b, the strength of the extending parts 38aa, 38ab increases to thereby make it possible to further suppress the amounts of the displacements of the weights 50, 52, 54, and 56, and the impact by the weights 50, 52, 54, and 56 even if the weights 50, 52, 54, and 56 have contact with the extending parts 38aa, 38ab, and thus, it is possible to prevent the breakage of the extending parts 38aa, 38ab (the support sections 30a, 30b) disposed in the periphery of the cantilever.

Further, the thickness of the extending parts 38aa, 38ab is made thicker than the thickness of the support sections 30a, 30b due to the protrusions of the both principal surfaces of the extending parts 38aa, 38ab, but it is also possible to make either one of the both principal surfaces of the extending parts 38aa, 38ab protrude to thereby make the thickness of the extending parts 38aa, 38ab thicker than the thickness of the support sections 30a, 30b.

Third Embodiment

Then, a physical quantity detector 1b according to a third embodiment of the invention will be described with reference to FIG. 8 and FIG. 9.

Figure 8:
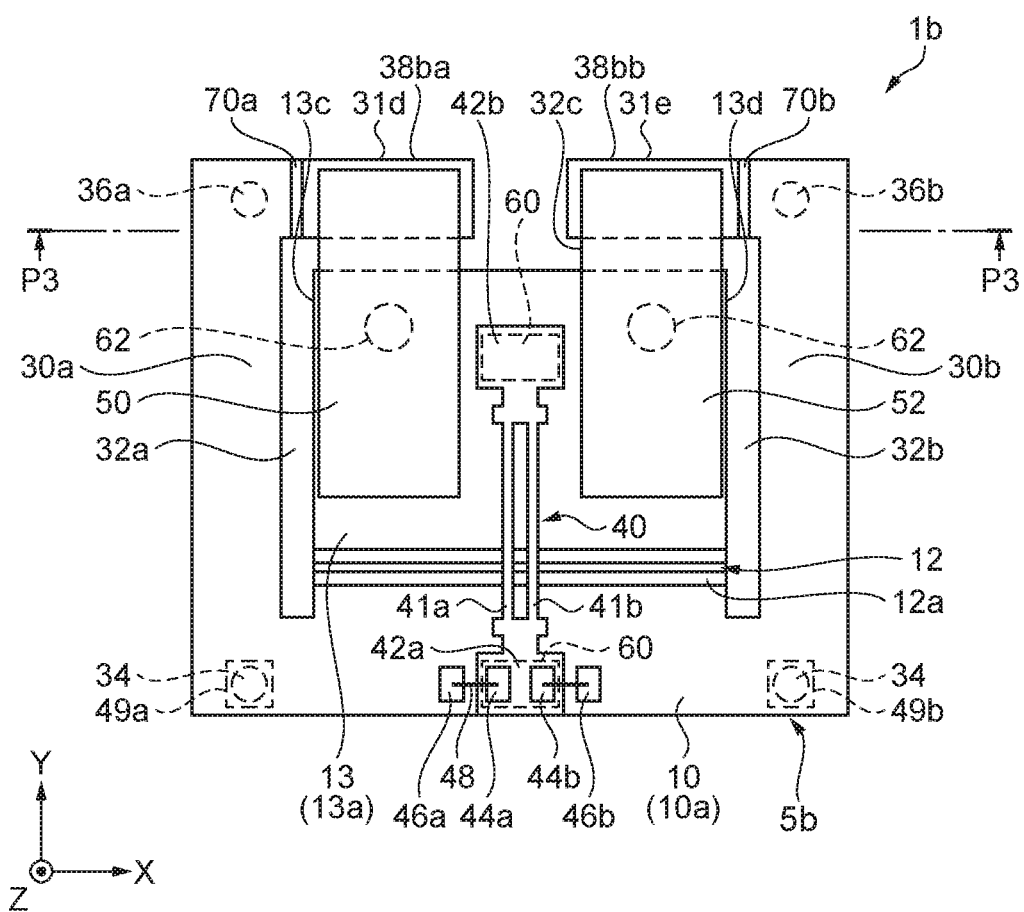
FIG. 8 is a plan view showing a configuration of a physical quantity detector according to a third embodiment of the invention.
Figure 9:
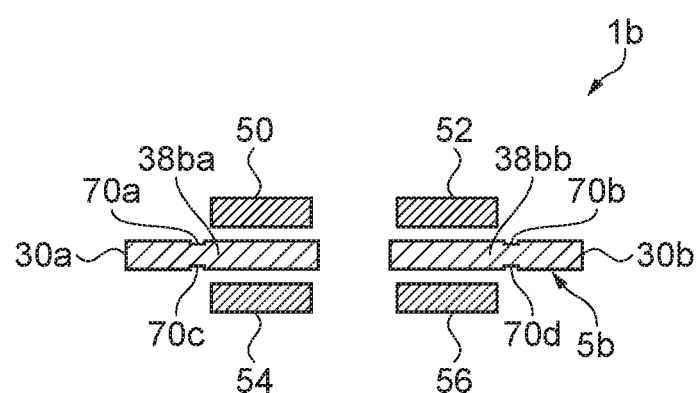
FIG. 9 is a cross-sectional view along the line P3-P3 shown in FIG. 8.

FIG. 8 is a plan view showing a configuration of the physical quantity detector 1b according to the third embodiment, and FIG. 9 is a cross-sectional view along the line P3-P3 shown in FIG. 8. It should be noted that the description will be presented with a focus on the differences from the embodiments described above, substantially the same constituents are denoted by the same reference symbols, and the description of substantially the same issues will be omitted.

The physical quantity detector 1b according to the third embodiment is different only in the configuration of extending parts 38ba, 38bb provided to a substrate section 5b from the physical quantity detector 1 according to the first embodiment.

As shown in FIG. 8 and FIG. 9, the physical quantity detector 1b is provided with recessed parts 70a, 70c disposed between the tip part of the extending part 38ba and the fixation section 36a, and is provided with recessed parts 70b, 70d disposed between the tip part of the extending part 38bb and the fixation section 36b.

According to the physical quantity detector 1b related to the third embodiment, since the extending parts 38ba, 38bb are provided with the recessed parts 70a, 70b, 70c, and 70d, the tip side of the extending parts 38ba, 38bb are easy to be deflected around the recessed parts 70a, 70b, 70c, and 70d when the weights 50, 52, 54, and 56 have contact with the extending parts 38ba, 38bb. Therefore, it is possible to suppress the amounts of the displacements of the weights 50, 52, 54, and 56 and the impact by the weights 50, 52, 54, and 56, and thus, it is possible to prevent the breakage of the extending parts 38ba, 38bb (the support sections 30a, 30b) disposed in the periphery of the cantilever.

It should be noted that although the recessed parts 70a, 70b, 70c, and 70d are disposed on the both principal surfaces of the extending parts 38ba, 38bb, it is also possible to dispose the recessed parts only on either one of the both principal surfaces of the extending parts 38ba, 38bb.

Fourth Embodiment

Then, a physical quantity detector 1c according to a fourth embodiment of the invention will be described with reference to FIG. 10 and FIG. 11.

Figure 10:
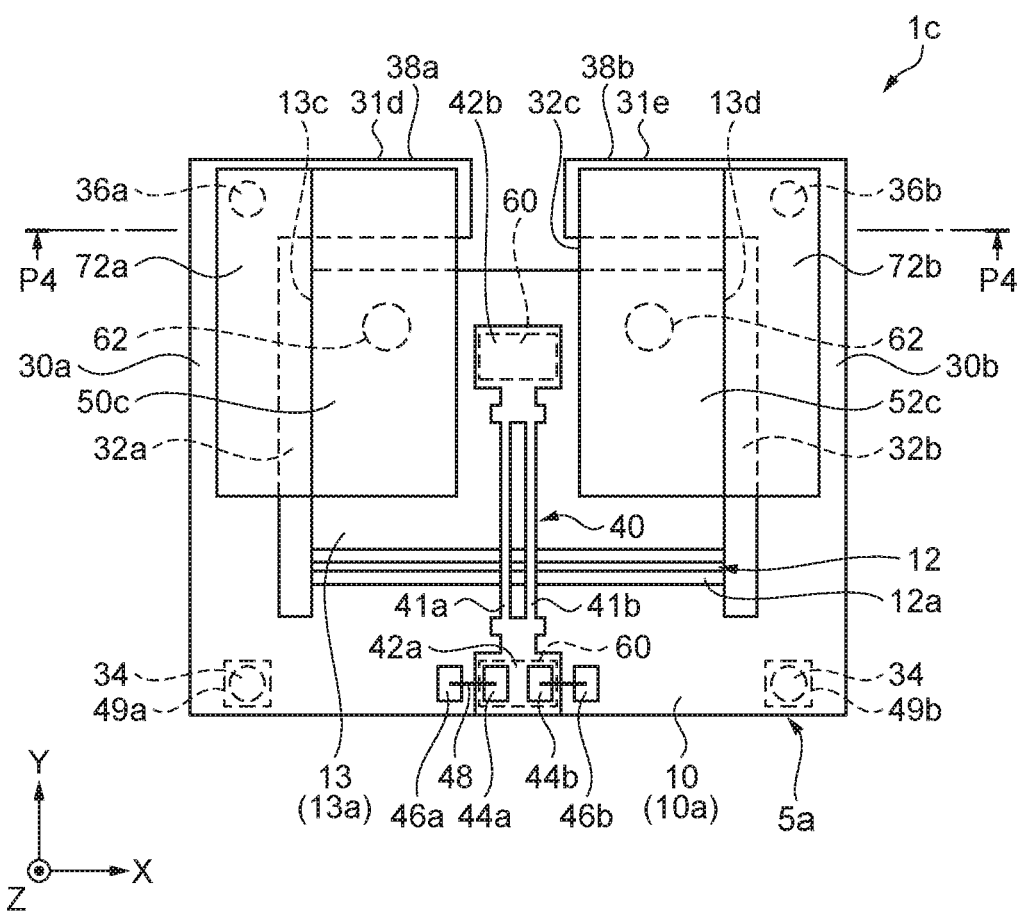
FIG. 10 is a plan view showing a configuration of a physical quantity detector according to a fourth embodiment of the invention.
Figure 11:
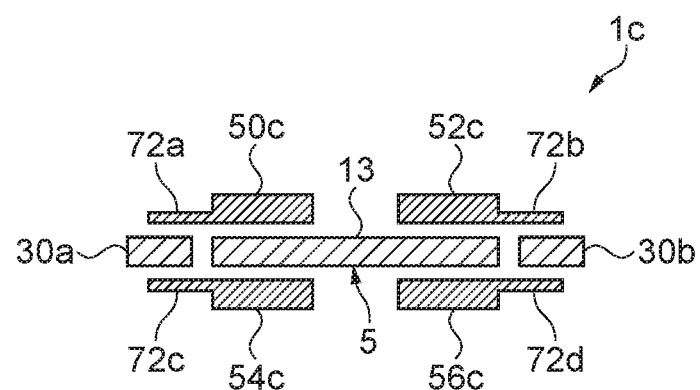
FIG. 11 is a cross-sectional view along the line P4-P4 shown in FIG. 10.

FIG. 10 is a plan view showing a configuration of the physical quantity detector 1c according to the fourth embodiment, and FIG. 11 is a cross-sectional view along the line P4-P4 shown in FIG. 10. It should be noted that the description will be presented with a focus on the differences from the embodiments described above, substantially the same constituents are denoted by the same reference symbols, and the description of substantially the same issues will be omitted.

The physical quantity detector 1c according to the fourth embodiment is different only in the configuration of weights 50c, 52c, 54c, and 56c fixed to the movable part 13 from the physical quantity detector 1 according to the first embodiment.

As shown in FIG. 10 and FIG. 11, the physical quantity detector 1c is configured so that the thickness of parts of the weights 50c, 52c, 54c, and 56c overlapping the support sections 30a, 30b in the planar view is thinner than the thickness of parts of the weights 50c, 52c, 54c, and 56c overlapping the movable part 13. In other words, in the areas overlapping the support sections 30a, 30b of the weights 50c, 52c, 54c, and 56c, there are disposed thin wall parts 72a, 72b, 72c, and 72d, respectively.

According to the physical quantity detector 1c related to the fourth embodiment, since the thickness of the parts overlapping the support sections 30a, 30b of the weights 50c, 52c, 54c, and 56c is thinner than the thickness of the parts overlapping the movable part 13 of the weights 50c, 52c, 54c, and 56c, the weights 50c, 52c, 54c, and 56c in the areas overlapping the support sections 30a, 30b become easy to be deflected. Therefore, when the weights 50c, 52c, 54c, and 56c have contact with the support sections 30a, 30b, the thin wall parts 72a, 72b, 72c, and 72d are deflected to thereby make it possible to suppress the amounts of the displacements of the weights 50c, 52c, 54c, and 56c and the impact by the weights 50c, 52c, 54c, and 56c, and thus, it is possible to prevent the breakage of the support sections 30a, 30b disposed in the periphery of the cantilever.

It should be noted that although the thickness of the parts overlapping the support sections 30a, 30b of the weights 50c, 52c, 54c, and 56c is made thinner than the thickness of the parts overlapping the movable part 13 by providing the recessed parts to the opposite surfaces to the principal surfaces opposed to the support sections 30a, 30b of the weights 50c, 52c, 54c, and 56c, it is also possible to provide the recessed parts to the principal surfaces opposed to the support sections 30a, 30b to reduce the thickness, or it is also possible to provide the recessed parts to the both principal surfaces of each of the weights 50c, 52c, 54c, and 56c to reduce the thickness. Further, it is also possible to make the thickness in the areas opposed to the extending parts 38a, 38b of the weights 50c, 52c, 54c, and 56c thinner than the thickness of the parts overlapping the movable part 13 of the weights 50c, 52c, 54c, and 56c.

Fifth Embodiment

Then, a physical quantity detector 1d according to a fifth embodiment of the invention will be described with reference to FIG. 12 and FIG. 13.

Figure 12:
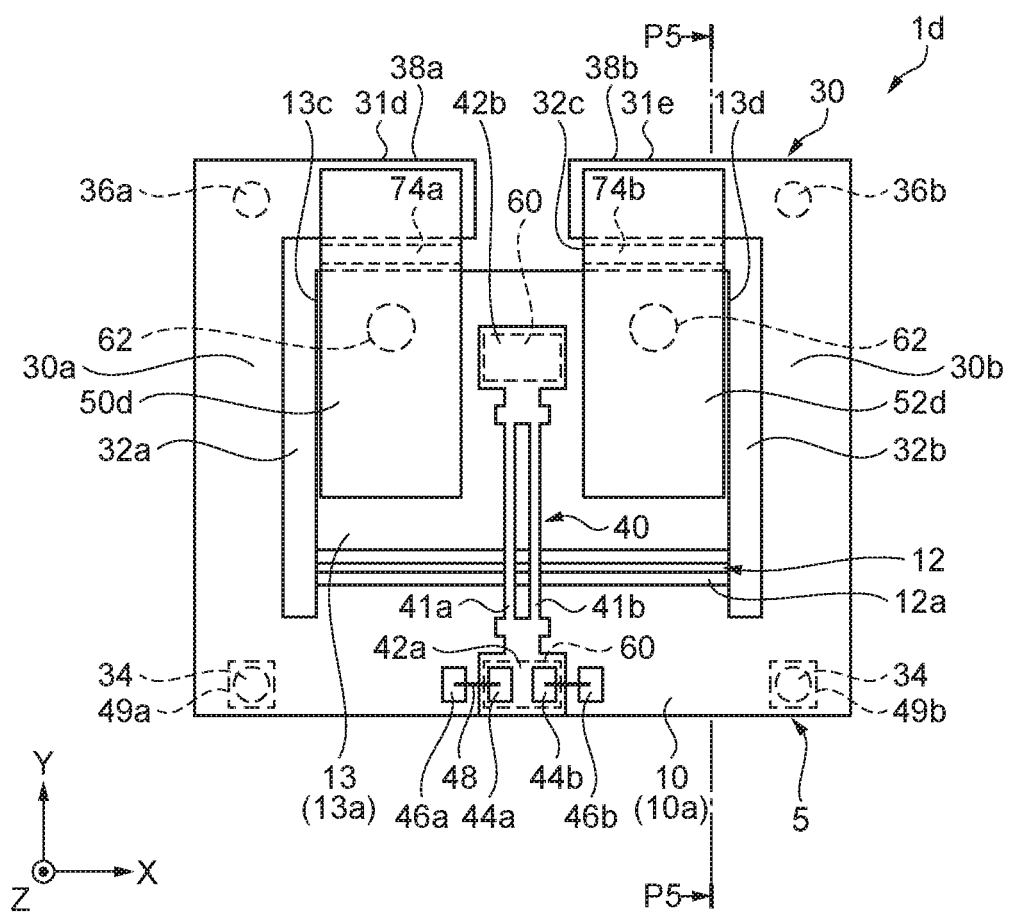
FIG. 12 is a plan view showing a configuration of a physical quantity detector according to a fifth embodiment of the invention.
Figure 13:
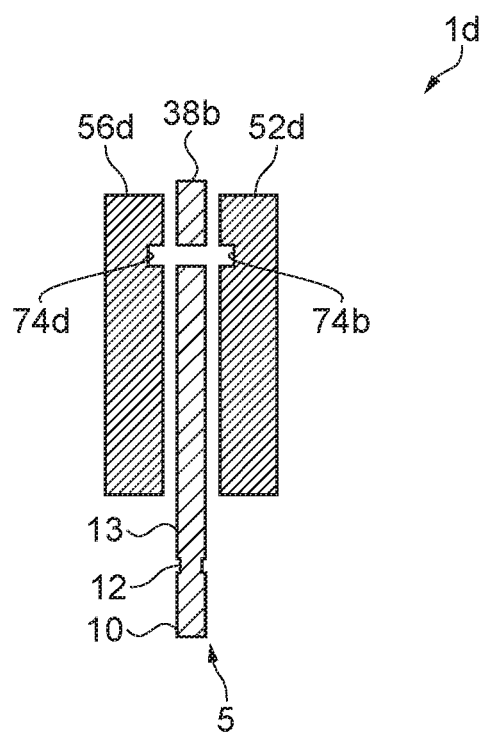
FIG. 13 is a cross-sectional view along the line P5-P5 shown in FIG. 12.

FIG. 12 is a plan view showing a configuration of the physical quantity detector 1d according to the fifth embodiment, and FIG. 13 is a cross-sectional view along the line P5-P5 shown in FIG. 12. It should be noted that the description will be presented with a focus on the differences from the embodiments described above, substantially the same constituents are denoted by the same reference symbols, and the description of substantially the same issues will be omitted.

The physical quantity detector 1d according to the fifth embodiment is different only in the configuration of weights 50d, 52d, 54d, and 56d fixed to the movable part 13 from the physical quantity detector 1 according to the first embodiment.

As shown in FIG. 12 and FIG. 13, in the physical quantity detector 1d, the weights 50d, 52d, 54d, and 56d are provided with recessed parts 74a, 74b, 74c, and 74d disposed in parts between areas where the weights 50d, 52d, 54d, and 56d are fixed to the movable part 13, and areas where the weights 50d, 52d, 54d, and 56d overlap the extending parts 38a, 38b, respectively, in the planar view.

According to the physical quantity detector 1d related to the fifth embodiment, since the weights 50d, 52d, 54d, and 56d are provided with the recessed parts 74a, 74b, 74c, and 74d disposed in the parts between the areas where the weights 50d, 52d, 54d, and 56d are fixed to the movable part 13, and the areas where the weights 50d, 52d, 54d, and 56d overlap the extending parts 38a, 38b, respectively, the weights 50d, 52d, 54d, and 56d are easy to be deflected around the recessed parts 74a, 74b, 74c, and 74d when the weights 50d, 52d, 54d, and 56d have contact with the extending parts. Therefore, it is possible to suppress the amounts of the displacements of the weights 50d, 52d, 54d, and 56d and the impact by the weights 50d, 52d, 54d, and 56d, and thus, it is possible to prevent the breakage of the extending parts 38a, 38b (the support sections 30a, 30b) disposed in the periphery of the cantilever.

It should be noted that the recessed parts 74a, 74b, 74c, and 74d are provided to the principal surfaces opposed to the extending parts 38a, 38b of the weights 50d, 52d, 54d, and 56d, but can also be provided to the surfaces opposite to the principal surfaces opposed to the extending parts 38a, 38b, or can also be provided to the both principal surfaces of the weights 50d, 52d, 54d, and 56d, respectively.

Physical Quantity Detection Device

Then, a physical quantity detection device 100 equipped with any one of the physical quantity detectors 1 through 1d will be described with reference to FIG. 14 and FIG. 15.

Figure 14:
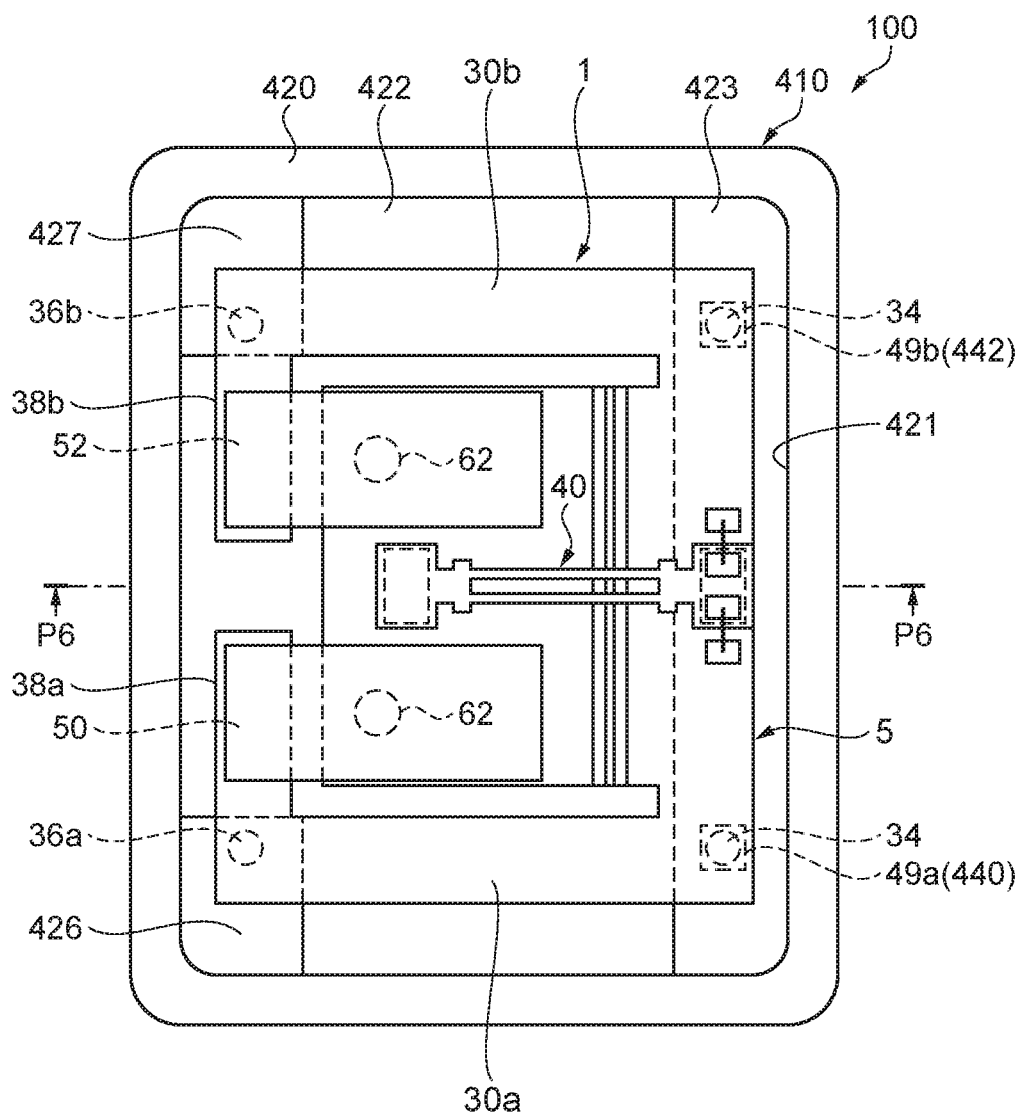
FIG. 14 is a plan view showing a physical quantity detection device equipped with the physical quantity detector.
Figure 15:
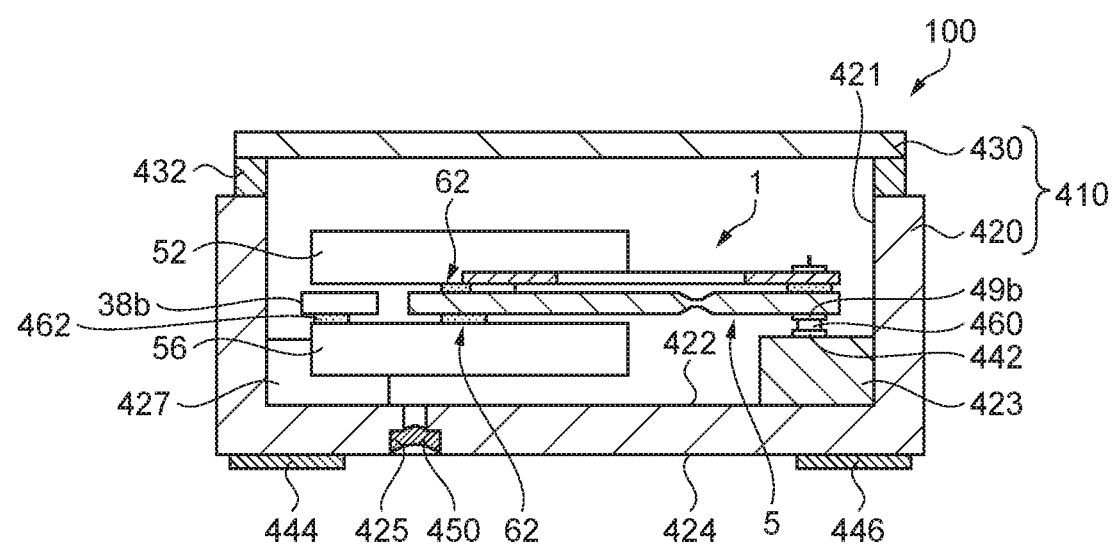
FIG. 15 is a cross-sectional view along the line P6-P6 shown in FIG. 14.

FIG. 14 is a perspective view showing the physical quantity detection device 100 equipped with the physical quantity detector 1, and FIG. 15 is a cross-sectional view along the line P6-P6 shown in FIG. 14.

In the physical quantity detection device 100, it is possible to use the physical quantity detectors 1 through 1d according to the invention, but in the present case, the physical quantity detector 1 is provided as shown in FIG. 14 and FIG. 15. It should be noted that as the physical quantity detection device 100, it is also possible to adopt a configuration of being provided with an electric circuit for controlling the physical quantity detector 1, and so on.

The physical quantity detection device 100 is configured including the substrate section 5 to which the weights 50, 52, 54, and 56 are fixed, and a package 410. The package 410 is constituted by a package base 420 and a lid 430. It should be noted that the lid 430 is omitted in FIG. 14. The package base 420 is provided with a recessed part 421, and the physical quantity detector 1 is housed in the recessed part 421. The package base 420 is formed of a sintered body of aluminum oxide obtained by stacking and then sintering ceramic green sheets, but a material such as quartz crystal, glass, or silicon can also be used.

The package base 420 has pedestal parts 426, 427 and a step part 423 protruding from the inner bottom surface (a bottom surface located inside the recessed part 421) 422 toward the lid 430, wherein the fixation section 36a of the support section 30a is fixed to the pedestal part 426 via an adhesive 462, and the fixation section 36b of the support section 30b is fixed to the pedestal part 427 via the adhesive 462. The step part 423 is provided with internal terminals 440, 442. The internal terminals 440, 442 are disposed at positions opposed to the external connection terminals 49a, 49b provided to the base section 10 of the physical quantity detector 1. On the outer bottom surface (a surface on the opposite side to the inner bottom surface 422) 424 of the package base 420, there are disposed external terminals 444, 446 used when being mounted on an external member such as an electronic apparatus, wherein the external terminals 444, 446 are electrically connected to the internal terminals 440, 442 via internal interconnections not shown.

The package base 420 is provided with a through hole 425 disposed in the bottom part of the recessed part 421 and penetrating from the outer bottom surface 424 to the inner bottom surface 422, and a sealing part 450 for blocking the through hole 425 to airtightly seal the inside of the package 410. It should be noted that it is also possible for the inside of the package 410 to be a roughly vacuum or reduced-pressure atmosphere, or an atmosphere filled with an inert gas such as nitrogen, helium, or argon.

The package fixation sections 34 of the base section 10 are fixed to the step part 423 of the package base 420 via an electrically conductive adhesive 460, and thus, the physical quantity detector 1 is housed in the package 410. Thus, the external connection terminals 49a, 49b provided to the package fixation sections 34 and the internal terminals 440, 442 provided to the step part 423 are electrically connected, respectively, with the electrically conductive adhesive 460.

The lid 430 has a plate-like shape, and is disposed so as to cover the recessed part 421 of the package base 420. As the lid 430, it is possible to use the same material as that of the package base 420, or metal such as Kovar or stainless steel, and in this case, Kovar is used. The lid 430 is bonded to the package base 420 via a seam ring 432.

In the physical quantity detection device 100 having such a configuration, when a drive signal is applied to the excitation electrodes of the physical quantity detection element 40 via the external terminals 444, 446, the internal terminals 440, 442, the external connection terminals 49a, 49b, the connection terminals 46a, 46b, and so on, the vibrating beam parts 41a, 41b of the physical quantity detection element 40 vibrate with a predetermined frequency. Since the resonance frequency of the physical quantity detection element 40 varies in accordance with the acceleration applied, the tilt, and so on, the physical quantity detection device 100 is capable of outputting the resonance frequency of the vibration as an output signal, and is used as an acceleration sensor, a tilt sensor, or the like having high detection sensitivity.

Electronic Apparatus

Then, an electronic apparatus equipped with any one of the physical quantity detectors 1 through 1d will be described with reference to FIG. 16 and FIG. 17.

Figure 16:
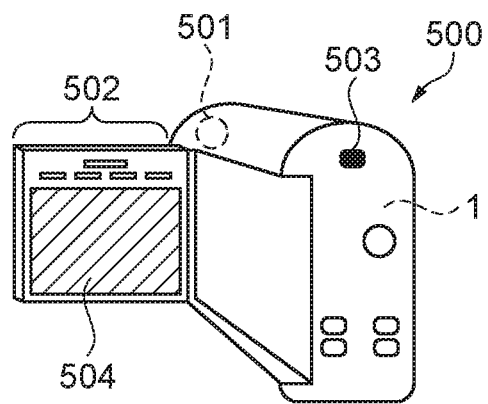
FIG. 16 is a perspective view showing a video camera as an electronic apparatus equipped with the physical quantity detector.
Figure 17:
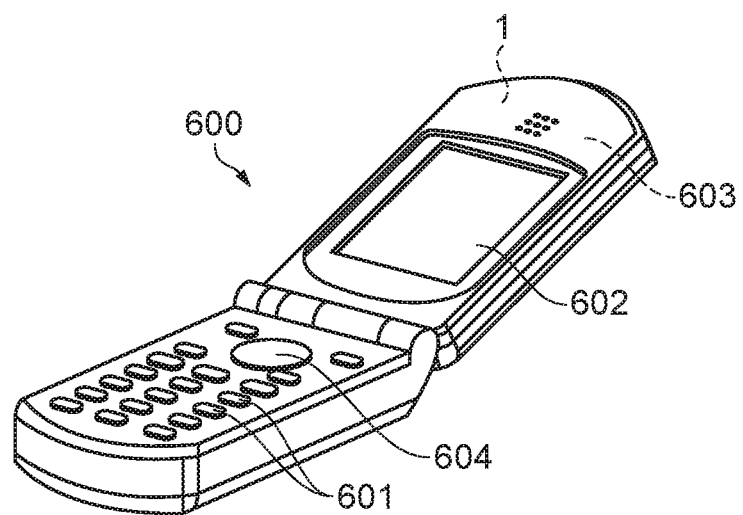
FIG. 17 is a perspective view showing a cellular phone as an electronic apparatus equipped with the physical quantity detector.

FIG. 16 is a perspective view showing a video camera as an electronic apparatus equipped with the physical quantity detector 1, and FIG. 17 is a perspective view showing a cellular phone as an electronic apparatus equipped with the physical quantity detector 1.

These electronic apparatuses are equipped with the physical quantity detector 1 out of the physical quantity detectors 1 through 1d according to the invention. Firstly, the video camera 500 shown in FIG. 16 is provided with an image receiving section 501, an operating section 502, a sound input section 503, and a display unit 504. The video camera 500 is provided with the physical quantity detector 1, and is capable of detecting the acceleration around at least one of the X axis, the Y axis, and the Z axis (not shown) perpendicular to each other, the tilt, or the like in accordance with the number of the physical quantity detectors 1 installed therein, to thereby exert a camera shake correction function. Thus, it is possible for the video camera 500 to record a clear dynamic picture image.

Further, the cellular phone 600 shown in FIG. 17 is provided with a plurality of operating buttons 601, a display unit 602, a camera mechanism 603, and a shutter button 604. The cellular phone 600 is provided with the physical quantity detector 1, and is capable of detecting the acceleration around at least one of the X axis, the Y axis, and the Z axis (not shown) perpendicular to each other, the tilt, or the like in accordance with the number of the physical quantity detectors 1 installed therein, to thereby make the camera mechanism 603 exert a camera shake correction function. Thus, it is possible for the cellular phone 600 to record a clear image with the camera mechanism 603.

Vehicle

Then, a vehicle equipped with any one of the physical quantity detectors 1 through 1d will be described with reference to FIG. 18.

Figure 18:
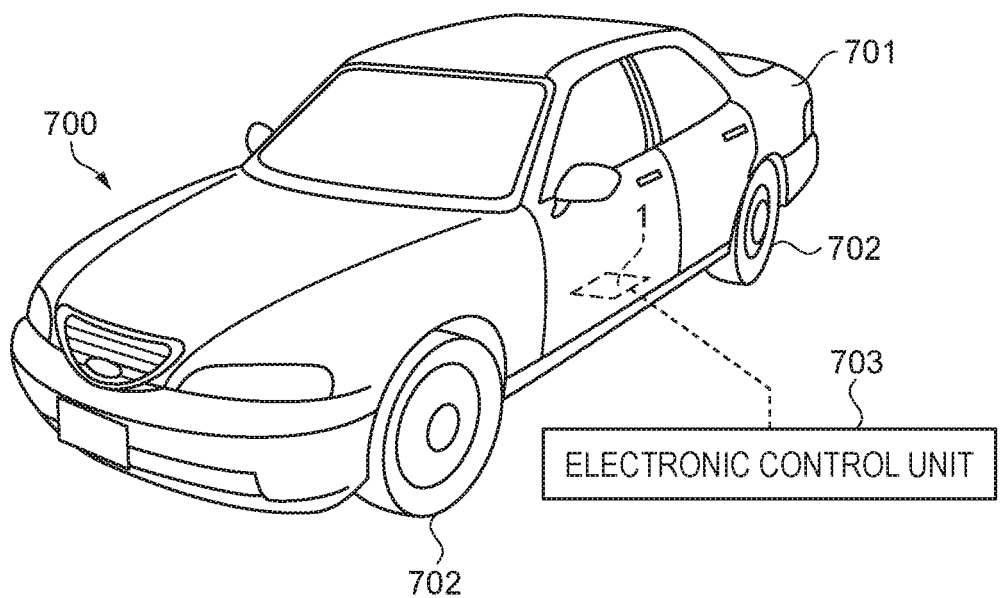
FIG. 18 is a perspective view showing a car as a vehicle equipped with the physical quantity detector.

FIG. 18 is a perspective view showing a car as a vehicle equipped with the physical quantity detector 1.

As shown in FIG. 18, in the car (the vehicle) 700, there is used the physical quantity detector 1 as an example. In the car 700, the physical quantity detector 1 is incorporated in an electronic control unit (ECU) 703 installed in a car body 701. The electronic control unit 703 is capable of figuring out the moving state and the attitude of the car 700 to thereby appropriately perform control of tires 702 and so on by detecting the acceleration, the tilt, and so on of the car body 701 by the physical quantity detector 1. Thus, it is possible for the car 700 to achieve safe and stable driving.

The physical quantity detectors 1 through 1d described hereinabove can be installed in an electronic control unit such as a keyless entry system, an immobilizer, a car navigation system, a car air-conditioner, an antilock brake system (ABS), an air-bag system, a tire pressure monitoring system (TPMS), an engine controller, a battery monitor for a hybrid car or an electric car, or a vehicle attitude control system besides the electronic apparatuses and the vehicle described above, and can thus be applied in a wide range of fields.

The entire disclosure of Japanese Patent Application No. 2017-050920, filed Mar. 16, 2017 is expressly incorporated by reference herein.

What is claimed is:

1. A physical quantity detector comprising:
   a plate-shaped substrate, the substrate having first, second, third, and fourth sides, the substrate being configured with:
   a substrate base located along the first side of the substrate;
   a movable member located at a central area of the substrate, the movable member being pivotally connected to and continuously extending from the substrate base;
   a first support located along the second side of the substrate, the first support continuously extending from the substrate base, the first support being laterally spaced apart from a first edge of the movable member;
   a second support located along the third side of the substrate, the second support continuously extending from the substrate base, the second support being laterally spaced apart from a second edge of the movable member, the first and second edges being opposite to each other, the second side and the third side being opposite to each other;
a first extending member located along the fourth side of the substrate, the first extending member continuously extending from an end of the first support distal from the substrate base, the first extending member being laterally spaced apart from a third edge of the movable member, the third edge extending between the first and second edges;
a second extending member located along the fourth side of the substrate, the second extending member continuously extending from an end of the second support distal from the substrate base, the second extending member being laterally spaced apart from the third edge of the movable member;
a free end of the first extending member facing a free end of the second extending member across an air gap; and
a tuning-fork vibrating element having a first end fixed to the substrate base and a second end fixed to the movable member, the tuning-fork vibrating element extending in a same direction as the second and third sides; and
first and second weights fixed to the movable member,
wherein the first and second extending members and the first and second weights overlap each other in a plan view, respectively.

2. The physical quantity detector according to claim 1, wherein thicknesses of the first and second extending members are larger than thicknesses of the first and second supports, respectively.

3. The physical quantity detector according to claim 1, wherein each of the first and second extending has a recess.

4. The physical quantity detector according to claim 1, wherein thicknesses of parts of the first and second weights overlapping the first and second supports are smaller than thicknesses of parts of the first and second weights overlapping the first and second movable members in the plan view, respectively.

5. The physical quantity detector according to claim 1, wherein the first weight has a first recess at a position between an area where the first weight is fixed to the movable member and an area where the first weight overlaps the first extending member in the plan view, and
the second weight has a second recess at a position between an area where the second weight is fixed to the movable member and an area where the second weight overlaps the second extending member in the plan view.

6. The physical quantity detector according to claim 1, wherein joining surfaces of the first and second weights that are fixed to the movable member are rough surfaces.

7. A physical quantity detection device comprising:
the physical quantity detector according to claim 1; and
a package that is configured with a package base, a step, and a lid, the package base having a recess, the step being disposed on a bottom of the package base, the lid covering the recess of the package base so as to form an inner space of the package,
wherein the substrate base of the substrate is fixed to the step so that the physical quantity detector is disposed in the inner space of the package.

8. A physical quantity detection device comprising:
the physical quantity detector according to claim 2; and
a package that is configured with a package base, a step, and a lid, the package base having a recess, the step being disposed on a bottom of the package base, the lid covering the recess of the package base so as to form an inner space of the package,
wherein the substrate base of the substrate is fixed to the step so that the physical quantity detector is disposed in the inner space of the package.

9. A physical quantity detection device comprising:
the physical quantity detector according to claim 3; and
a package that is configured with a package base, a step, and a lid, the package base having a recess, the step being disposed on a bottom of the package base, the lid covering the recess of the package base so as to form an inner space of the package,
wherein the substrate base of the substrate is fixed to the step so that the physical quantity detector is disposed in the inner space of the package.

10. A physical quantity detection device comprising:
the physical quantity detector according to claim 4; and
a package that is configured with a package base, a step, and a lid, the package base having a recess, the step being disposed on a bottom of the package base, the lid covering the recess of the package base so as to form an inner space of the package,
wherein the substrate base of the substrate is fixed to the step so that the physical quantity detector is disposed in the inner space of the package.

11. A physical quantity detection device comprising:
the physical quantity detector according to claim 5; and
a package that is configured with a package base, a step, and a lid, the package base having a recess, the step being disposed on a bottom of the package base, the lid covering the recess of the package base so as to form an inner space of the package,
wherein the substrate base of the substrate is fixed to the step so that the physical quantity detector is disposed in the inner space of the package.

12. An electronic apparatus having an X-axis, a Y-axis, and a Z-axis, the electronic apparatus comprising:
the physical quantity detector according to claim 1;
a display; and
a case that houses the physical quantity detector and the display,
wherein the physical quantity detector is configured to detect an acceleration around one of the X-axis, the Y-axis, or the Z-axis.

13. An electronic apparatus having an X-axis, a Y-axis, and a Z-axis, the electronic apparatus comprising:
the physical quantity detector according to claim 2;
a display; and
a case that houses the physical quantity detector and the display,
wherein the physical quantity detector is configured to detect an acceleration around one of the X-axis, the Y-axis, or the Z-axis.

14. An electronic apparatus having an X-axis, a Y-axis, and a Z-axis, the electronic apparatus comprising:
the physical quantity detector according to claim 3;
a display; and
a case that houses the physical quantity detector and the display,
wherein the physical quantity detector is configured to detect an acceleration around one of the X-axis, the Y-axis, or the Z-axis.

15. An electronic apparatus having an X-axis, a Y-axis, and a Z-axis, the electronic apparatus comprising:

the physical quantity detector according to claim 4;
a display; and
a case that houses the physical quantity detector and the display,
wherein the physical quantity detector is configured to detect an acceleration around one of the X-axis, the Y-axis, or the Z-axis.

16. An electronic apparatus having an X-axis, a Y-axis, and a Z-axis, the electronic apparatus comprising:
the physical quantity detector according to claim 5;
a display; and
a case that houses the physical quantity detector and the display,
wherein the physical quantity detector is configured to detect an acceleration around one of the X-axis, the Y-axis, or the Z-axis.

17. A vehicle comprising:
an electronic control unit having the physical quantity detector according to claim 1; and
a vehicle body housing the electronic control unit,
wherein the physical quantity detector is configured to detect an acceleration of the vehicle body.

18. A vehicle comprising:
an electronic control unit having the physical quantity detector according to claim 2; and
a vehicle body housing the electronic control unit,
wherein the physical quantity detector is configured to detect an acceleration of the vehicle body.

19. A vehicle comprising:
an electronic control unit having the physical quantity detector according to claim 3; and
a vehicle body housing the electronic control unit,
wherein the physical quantity detector is configured to detect an acceleration of the vehicle body.

20. A vehicle comprising:
an electronic control unit having the physical quantity detector according to claim 4; and
a vehicle body housing the electronic control unit,
wherein the physical quantity detector is configured to detect an acceleration of the vehicle body.

* * * * *